(12) United States Patent
Banerjee et al.

(10) Patent No.: US 11,436,055 B2
(45) Date of Patent: Sep. 6, 2022

(54) EXECUTION GRAPH ACCELERATION

(71) Applicant: Apple Inc., Cupertino, CA (US)

(72) Inventors: Kutty Banerjee, San Jose, CA (US); Michael Imbrogno, San Jose, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 16/688,487

(22) Filed: Nov. 19, 2019

(65) Prior Publication Data

US 2021/0096921 A1 Apr. 1, 2021

Related U.S. Application Data

(60) Provisional application No. 62/907,602, filed on Sep. 28, 2019.

(51) Int. Cl.
*G06F 9/50* (2006.01)
*G06F 9/54* (2006.01)

(52) U.S. Cl.
CPC .......... *G06F 9/5038* (2013.01); *G06F 9/5066* (2013.01); *G06F 9/546* (2013.01)

(58) Field of Classification Search
CPC ....... G06F 9/5038; G06F 9/5066; G06F 9/546
See application file for complete search history.

(56) References Cited

U.S. PATENT DOCUMENTS

| | | | | |
|---|---|---|---|---|
| 6,260,190 B1 * | 7/2001 | Ju | .......................... | G06F 8/445 |
| | | | | 712/205 |
| 2002/0056078 A1 * | 5/2002 | Inagaki | .................... | G06F 8/445 |
| | | | | 717/155 |
| 2018/0349145 A1 * | 12/2018 | Tye | ........................... | G06F 9/505 |
| 2019/0213146 A1 * | 7/2019 | Islam | ................... | G06F 16/9024 |

\* cited by examiner

*Primary Examiner* — Emerson C Puente
*Assistant Examiner* — Jonathan R Labud
(74) *Attorney, Agent, or Firm* — Blank Rome LLP

(57) ABSTRACT

A first command is fetched for execution on a GPU. Dependency information for the first command, which indicates a number of parent commands that the first command depends on, is determined. The first command is inserted into an execution graph based on the dependency information. The execution graph defines an order of execution for plural commands including the first command. The number of parent commands are configured to be executed on the GPU before executing the first command. A wait count for the first command, which indicates the number of parent commands of the first command, is determined based on the execution graph. The first command is inserted into cache memory in response to determining that the wait count for the first command is zero or that each of the number of parent commands the first command depends on has already been inserted into the cache memory.

20 Claims, 8 Drawing Sheets

EXECUTION GRAPH ACCELERATION

TECHNICAL FIELD

This disclosure relates generally to the field of graphics processing. More particularly, but not by way of limitation, this disclosure relates to resolving dependencies among commands sent to a graphics processing unit (GPU) for execution and using caching techniques to ensure low latency and GPU idle time.

BACKGROUND

Computers and other computational devices typically have at least one programmable processing element that is generally known as a central processing unit (CPU). They frequently also have other programmable processors that are used for specialized processing of various types, such as processors for graphic processing operations which are typically called graphic processing units (GPUs). GPUs generally comprise multiple cores, each designed for executing the same instruction on parallel data streams, making them more effective than general-purpose CPUs for algorithms in which processing of large blocks of data is done in parallel. In general, a CPU functions as the host and hands-off specialized processing tasks to the GPU.

Graphics commands generated by the CPU are communicated to the GPU for execution. In order to expedite the execution time of the graphics commands, the idle time of the GPU hardware must be reduced by selecting a proper order of commands for processing. However, adopting a proper order for execution on the GPU is especially difficult when multiple graphics commands depend on each other. Further, valuable GPU cycles may be wasted when a high-priority GPU firmware interrupt thread that interacts with GPU hardware and supplies commands for execution on the GPU relies on a low-priority background thread to update a list of ready commands that are determined to be ready for execution on the GPU. The GPU may be sitting idle for a significant time while the GPU firmware is determining the dependencies between commands and determining whether a given command is ready for submission to the GPU for processing.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method comprises: fetching a first command for execution on a graphics processing unit (GPU); determining dependency information for the first command, wherein the dependency information indicates a number of parent commands that the first command depends on; inserting the first command into an execution graph, based, at least in part, on the determined dependency information for the first command, wherein the execution graph defines an order of execution for a plurality of commands, wherein the plurality of commands include the first command, and wherein the number of parent commands that the first command depends on are configured to be executed on the GPU before the first command is executed; determining a wait count for the first command based on the execution graph, wherein the wait count for the first command is the number of parent commands the first command depends on; determining whether each of the number of parent commands has completed execution on the GPU by determining whether the wait count for the first command is zero; determining whether each of the number of parent commands has been inserted into an execution graph cache; and inserting the first command into the execution graph cache in response to determining that each of the number of parent commands has completed execution on the GPU or has been inserted into the execution graph cache.

In another embodiment, the method is embodied in computer executable program code and stored in a non-transitory storage device. In yet another embodiment, the method could be implemented on a corresponding computer system and/or portable electronic device.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

Figure 1:
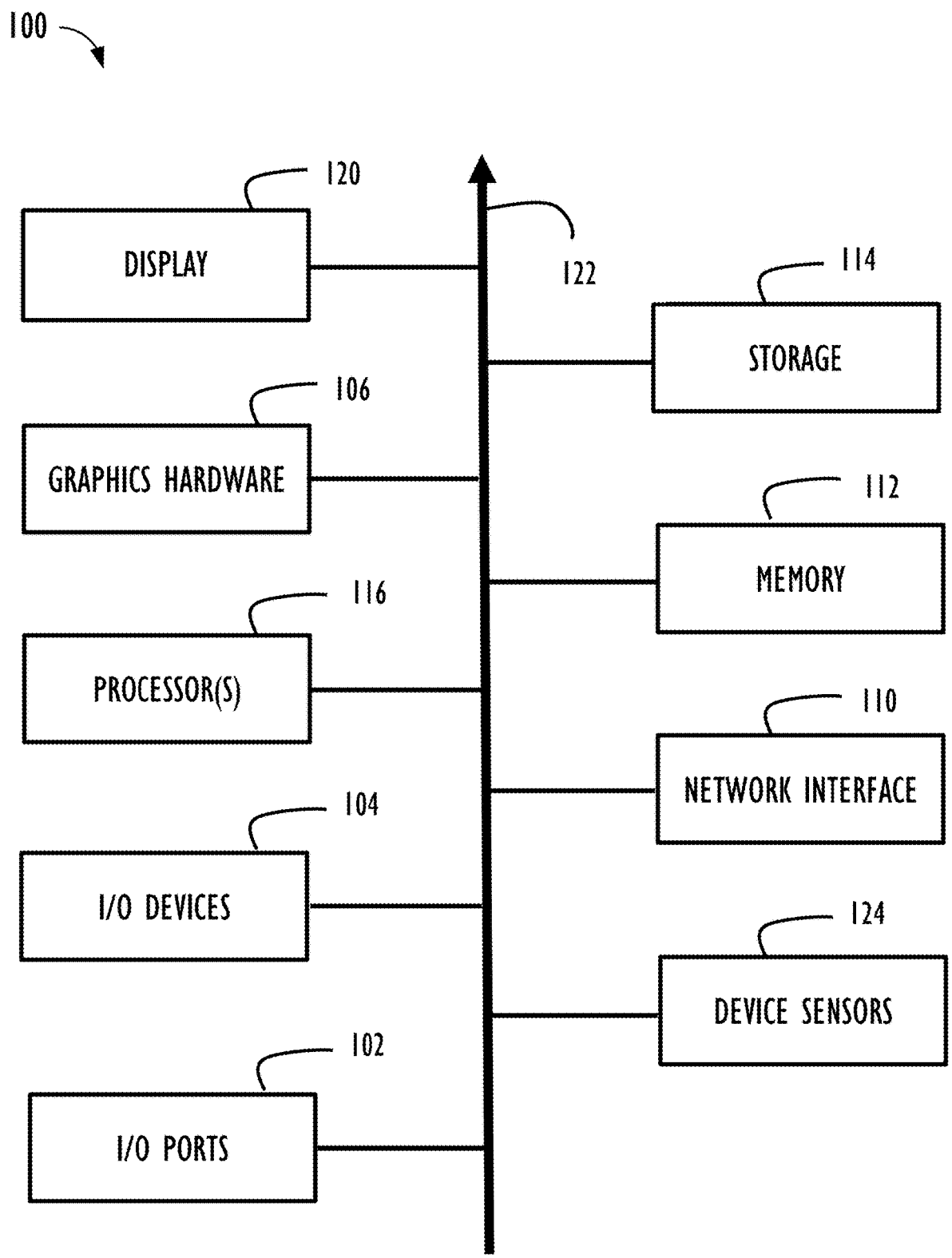
FIG. 1 is a block diagram illustrating a computer system implementing one or more aspects of the disclosed subject matter according to one or more embodiments.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class, of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or another smart device). Similarly, a machine-readable medium can refer to a single physical medium or a plurality of media that may together contain the indicated information stored thereon. A processor can refer to a single processing element or a plurality of processing elements, implemented either on a single chip or on multiple processing chips.

This disclosure pertains to reducing latency in feeding commands (e.g., graphics or computational commands or micro-commands respectively corresponding to micro-operations of a complex graphics or computational command) to the GPU for processing and increasing GPU efficiency by reducing the amount of time the GPU stays idle while waiting for the next command. A host CPU may encode commands for execution on the GPU in one or more command queues associated with one or more applications. GPU firmware may utilize a low-priority background thread to fetch commands from the one or more command queues and perform pre-processing operations. For example, the firmware background thread may perform a dependency analysis to resolve dependencies between the fetched commands and determine an order in which the commands (from the one or more command queues) may be executed and determine whether any two given commands may be executed in parallel. In one embodiment, the background thread may add dependency information based on the dependency analysis for each incoming command into a data structure and use the information in the data structure to construct and maintain an execution graph indicating an execution order of the commands. For example, the execution graph may be a Directed Acyclic Graph (DAG) with each node representing a command and each edge representing a dependency or a parent-child relationship between the two connected nodes. Each command in the execution graph may be associated with a wait count, where the wait count is indicative of the number of (e.g., zero or more un-processed) parent commands a particular (child) command depends on. The particular command can be executed on the GPU after execution of its parent commands has been completed (i.e., wait count=0) or if it the particular command does not have any parents (e.g., root node where wait count is also zero).

In one embodiment, based on the constructed and maintained execution graph indicating dependencies and wait counts for each command, GPU firmware may insert and maintain a subset of the commands in an execution graph cache for processing on the GPU. In one embodiment, the execution graph cache may be implemented as an adjacency matrix in which a subset of the commands from the execution graph may be inserted along with their child dependency information and wait count. GPU firmware may include a predetermined insertion policy for determining which of the commands from the execution graph may be selected for inserting and storing in the cache. For example, the insertion policy may specify that only those commands whose parents have already completed execution or whose parents are all already in the cache, may be inserted in the cache (depending on space availability in the cache). The insertion policy may further specify that commands may be inserted into the cache in a Breadth-first search (BFS) order based on the wait count. The GPU firmware background thread may continuously and asynchronously perform the pre-processing steps for incoming commands to add the commands to the data structure, update the execution graph, determine the wait count, and insert commands into the execution graph cache based on the insertion policy.

Asynchronously, a GPU firmware (high-priority) interrupt thread may kick commands with a wait count of zero from the execution graph cache to the GPU for execution. Upon receiving a kick completion from the GPU indicating completion of execution of the kicked command, the interrupt thread may perform an edge walk (e.g., traversal) for the completed command. In one embodiment, the edge walk may entail the interrupt thread fetching a row on a cache line (e.g., 64-bit or 128-bit double word, and the like) from the execution graph cache storing dependency information of the completed command in a row of the adjacency matrix. For example, each bit in the row may correspond to a node or command and a set bit may indicate that the corresponding (child) node or command depends on the completed (parent) command corresponding to the row. The interrupt thread may iterate over the row for each bit that is set, go to the corresponding row of the child node, and decrement the wait count of the child node by a single unit in the execution graph cache. Since the adjacency matrix is stored in cache memory which provides memory locality and contiguous storage processing time for the edge walk may be kept very low. Because of the decrement, if the child node wait count is now zero, interrupt thread may be able to immediately kick that child command for execution on the GPU, thereby reducing a dependency stall time that begins to run upon completion of the parent command execution on the GPU. The background thread may then perform post-processing operations on the completed command like cache flushing, updating cache memory, and the like.

The interrupt thread does not need to go back to the background thread upon receipt of the kick completion from the GPU. Nor does the interrupt thread need to request the background thread to do an edge walk using the execution graph to identify the next command that is now ready to execute and put the command in the cache. Rather, the interrupt thread can directly perform a much faster edge walk operation for the completed command by reading from the cache memory, the row (cache line) corresponding to the completed command, and decrementing the wait count (which is also in the cache) for each of the commands that are in the cache and that depend on the completed command. As a result, the "round-trip" time from interrupt thread to the background thread to update a ready command buffer with the new ready command, and back to the interrupt thread to kick the new ready command to the GPU, is eliminated. This reduces latency in processing of commands at the GPU. Also, edge walking the execution graph by the background thread may involve "pointer chasing," which is inherently latency sensitive, since it involves accessing multiple memory cells that may be scattered all over memory. By storing in an adjacency matrix in cache memory (which provides memory locality and contiguous storage), the dependency information and wait counts for a subset of the commands in the execution graph, and decrementing the wait counts of dependent (child) commands directly in the cache, the GPU firmware can reduce the dependency stall between completion of execution of a parent command and start of execution of a child command on the GPU. Techniques disclosed herein can be employed to reduce a dependency stall latency time in a worst-case scenario and significantly improve GPU performance and reduce GPU idle time.

Referring to FIG. 1, the disclosed embodiments may be performed by representative computer system 100. For example, representative computer system 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, hand-held computers, personal digital assistants (PDAs), cellular telephones, smart phones, laptops, tablets, wearables, entertainment systems, other consumer electronic devices, and the like) which have fewer components or perhaps more components may also be used to implement one or more embodiments.

As illustrated in FIG. 1, computer system 100, which is a form of a data processing system, includes bus 122 which is coupled to processor(s) 116, which may be CPUs and/or GPUs, memory 112, which may include one or both of a volatile read/write random access memory (RAM) and a read-only memory (ROM), and non-volatile storage device 114. Processor(s) 116 may retrieve instructions from memory 112 and storage device 114 and execute the instructions to perform operations described herein. Bus 122 interconnects these various components together and also interconnects processor 116, memory 112, and storage device 114 to display device 120, I/O ports 102 and peripheral devices such as input/output (I/O) devices 104 which may be pointing devices such as a mouse or stylus, keyboards, touch screens, modems, network interfaces, printers and other devices which are well known in the art. Typically, input/output devices 104 are coupled to the system through input/output controller(s).

Computer system 100 may also have device sensors 124, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, Global Positioning Systems (GPS), microphones, charge-coupled devices (CCDs) (or other image sensors), infrared sensors, thermometers, etc. These and other sensors may work in combination with one or more GPUs, digital signal processors (DSPs), application specific integrated circuits (ASICs), field programmable gate arrays (FPGAs), or conventional microprocessors along with appropriate programming so the sensor outputs may be properly interpreted and/or combined and interpreted.

Device Sensors 124 may capture contextual and/or environmental phenomena such as time; location information; the status of the device with respect to light, gravity, a magnetic field (e.g., a magnetometer); and even still and video images. In addition, network-accessible information, such as weather information, may also be used as part of the context. All captured contextual and environmental phenomena may be used to provide context to user activity or information about user activity. For example, in accessing a gesture or the expression or emotion of a user, the contextual information may be used as part of the contextual analysis. Computer system 100 may react to environmental and contextual actions and reflect a reaction in real-time on the display system through use of graphics hardware 106.

Where volatile RAM is included in memory 112, the RAM is typically implemented as dynamic RAM (DRAM), which requires continuous power in order to refresh or maintain the data in the memory. Graphics hardware 106 may be a special purpose computational hardware for processing graphic and/or assisting processor 116 in performing computational tasks. In some embodiments, graphics hardware 106 may include CPU-integrated graphics and/or one or more programmable GPUs, ASICs, and/or FPGAs.

Storage device 114 is typically a magnetic hard drive, an optical drive, a non-volatile solid-state memory device, or other types of memory systems, which maintain data (e.g., large amounts of data) even after power is removed from the system (i.e., non-volatile). While FIG. 1 shows that storage device 114 is a local device coupled directly to the rest of the components of computer system 100, other embodiments may utilize a non-volatile memory which is remote from system 100, such as a network storage device (e.g., cloud-based storage) which is coupled to system 100 through network interface 110, which may be a wired or wireless networking interface. Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
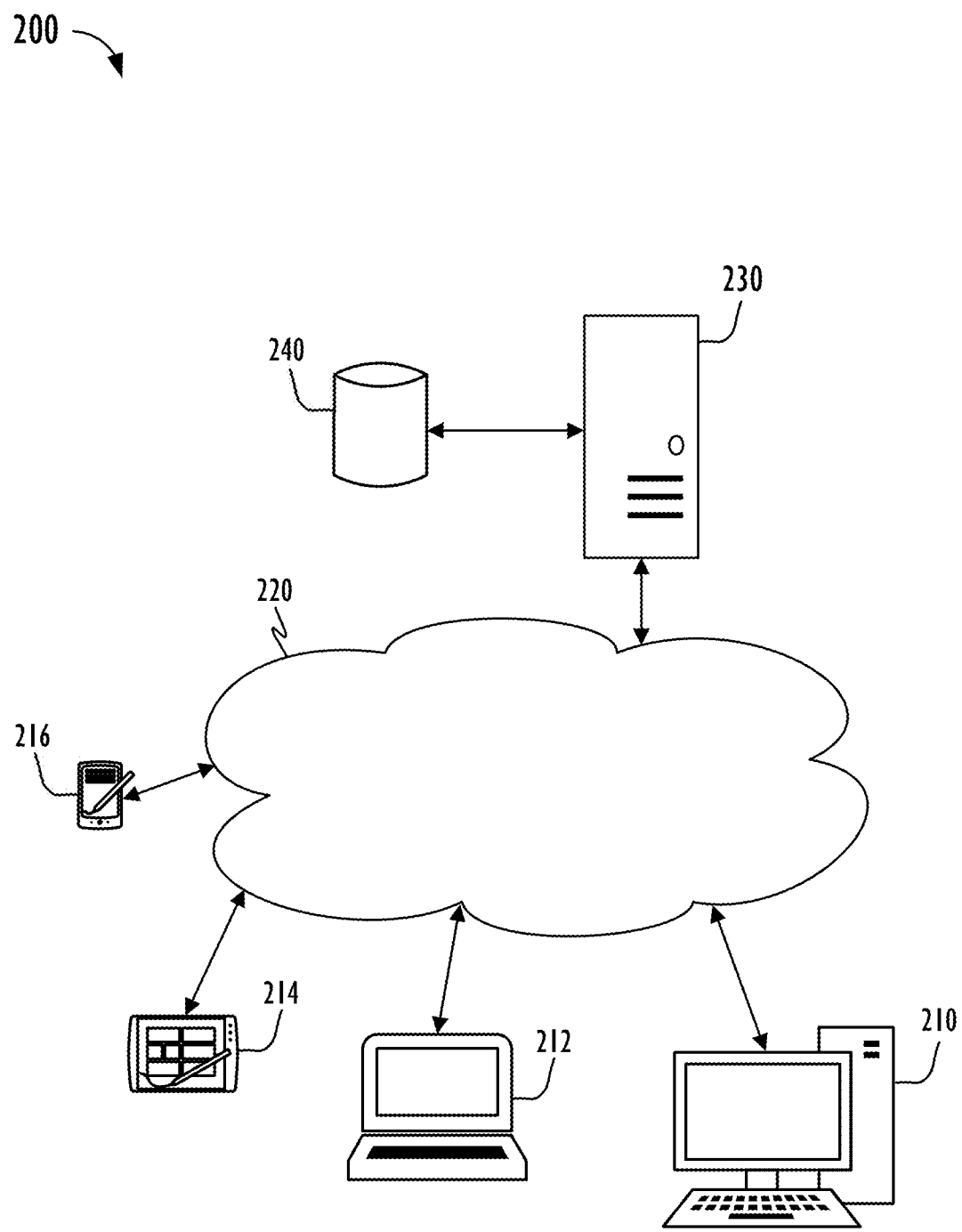
FIG. 2 is a block diagram illustrating a network environment that may be associated with one or more embodiments of the disclosed subject matter.

Turning now to FIG. 2, block diagram 200 illustrates a network of interconnected programmable devices, including server 230 and an associated datastore 240, as well as desktop computer system 210, laptop computer system 212, tablet computer system 214, and mobile phone 216 (e.g., smartphone). Any of these programmable devices may be the system shown as computing system 100 of FIG. 1. Network 220 that interconnects the programmable devices may be any type of network, wired or wireless, local or wide area, public or private, using any desired network communication protocol for transport of data from one system to another. Although illustrated as a single Network 220, any number of interconnected networks may be used to connect the various programmable devices, and each may employ a different network technology.

In one example, desktop workstation 210 may be a developer system, distributing a graphic application to server 230, which in turn may distribute the graphic application to multiple devices 212, 214, and 216, each of which may employ a different GPU as well as other different components. Upon launch of the graphic application, one action performed by the application can be creation of a collection of pipeline objects that may include state information, fragment shaders, and vertex shaders.

As noted above, embodiments of the subject matter disclosed herein include software. As such, a description of common computing software architecture is provided as expressed in layer diagram 300 in FIG. 3. Like the hardware examples, the software architecture discussed here is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs, GPUs, ASICs, FPGAs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer, exemplified by O/S services 350. O/S services may provide core O/S functions in a protected environment. In addition, O/S services shown in layer 385 may include frameworks for OpenGL® 351, Metal 352, Software Raytracer 353, and a Pure Software Rasterizer 354 (OpenGL is a registered trademark of Hewlett Packard Enterprise Development LP). These particular examples all relate to graphic and/or graphic libraries and are chosen to illuminate the topic of many embodiments herein, which relate to graphic handling. These particular examples also represent graphic frameworks/libraries that may operate in the lower tier of frameworks, such that developers may use shading and graphic primitives and/or obtain fairly tightly coupled control over the graphic hardware. In addition, the particular examples named in layer 385 may pass their work product on directly to hardware or hardware drivers, which is software typically tightly coupled to the hardware.

Referring again to FIG. 3, OpenGL 351 represents an example of a well-known library and application programming interface (API) for graphics rendering including 2D and 3D graphics. Metal 352 also represents a published graphic library and framework, but it is lower level than OpenGL 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphic information such as pixels without specialized graphic hardware (e.g., using only the CPU). These libraries or frameworks shown within the O/S services layer 385 are only exemplary and intended to show the general level of the layer and how it relates to other software in a sample arrangement (e.g., kernel operations usually below and higher-level application services 360 usually above). In addition, it may be useful to note that metal 352 represents a published framework/library of Apple Inc. that is known to developers in the art.

Above O/S services layer 385 is an application services layer 380, which includes SpriteKit 361, Scene Kit 362, Core Animation 363, and Core Graphics 364. The O/S services layer represents higher-level frameworks that are commonly directly accessed by application programs. In some embodiments of this disclosure the O/S services layer may include graphic-related frameworks that are high level in that they are agnostic to the underlying graphic libraries (such as those discussed with respect to layer 385). In such embodiments, these higher-level graphic frameworks are meant to provide developer access to graphic functionality in a more user- and developer-friendly way and to allow developers to avoid having to work with shading and graphic primitives. By way of example, SpriteKit 361 is a graphic rendering and animation infrastructure made available by Apple Inc. SpriteKit 361 may be used to animate two-dimensional (2D) textured images, or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphic rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Figure 3:
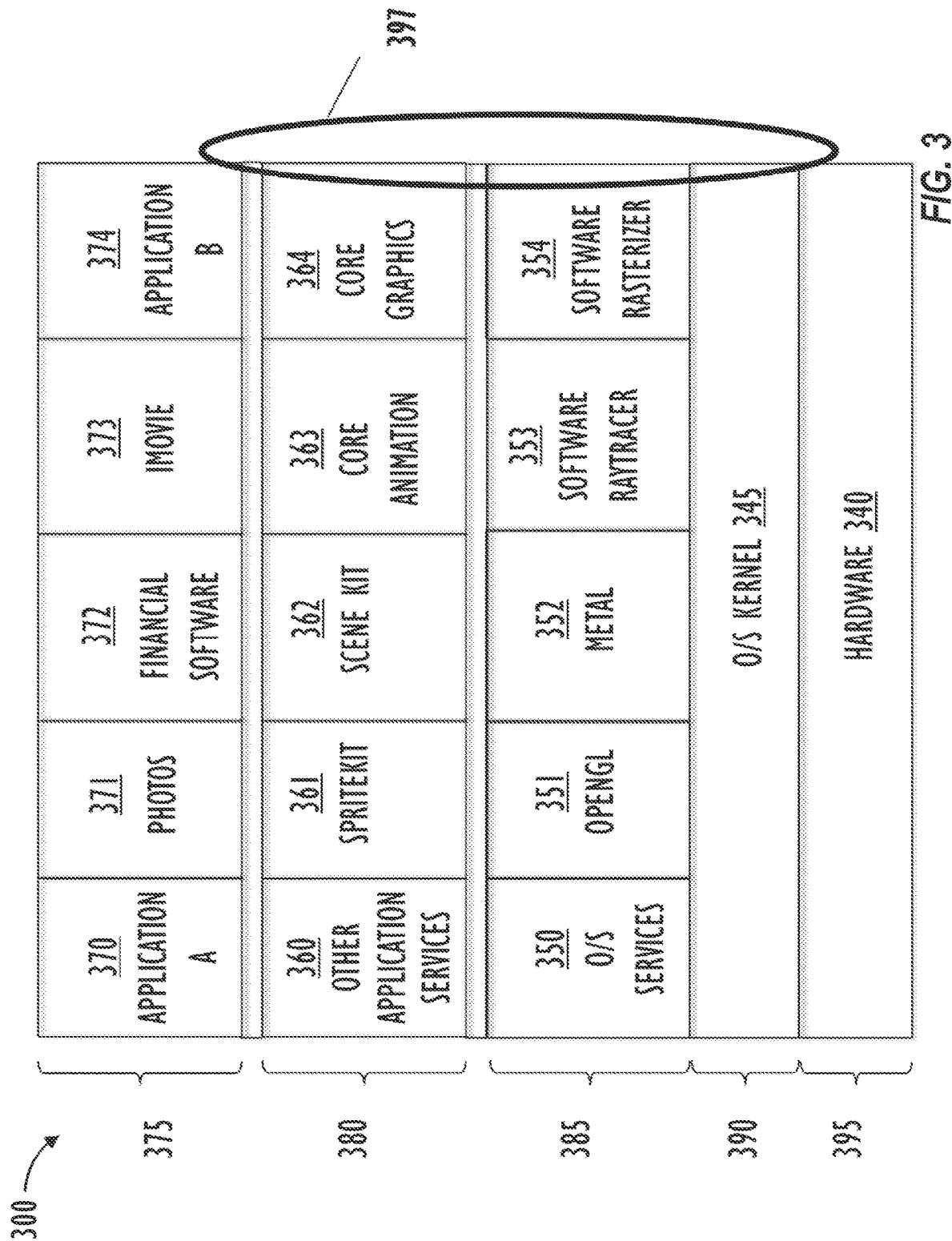
FIG. 3 is a block diagram showing an illustrative software architecture diagram according to one or more embodiments of the disclosed subject matter.

Above the application services layer 380, is the application layer 375, which may comprise any number and type of application programs. By way of example, FIG. 3 shows three specific applications: photos 371 (a photo management, editing, and sharing program), Financial Software (a financial management program), and iMovie 373 (a movie making and sharing program). Application layer 375 also shows two generic applications 370 and 374, which represent the presence of any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 395 and application 375 layers, shown by 397.

With reference again to FIG. 3, some embodiments may suggest the use of higher-level frameworks, such as those shown in application services layer 380. The high-level frameworks may perform intelligent analysis on particular graphic requests from application programs. The high-level framework may then choose a specific hardware and/or a specific library or low-level framework to help process the request. In these embodiments, the intelligent analysis may provide for on-the-fly decision making regarding the best path for the graphic request to follow down to hardware.

Figure 4:
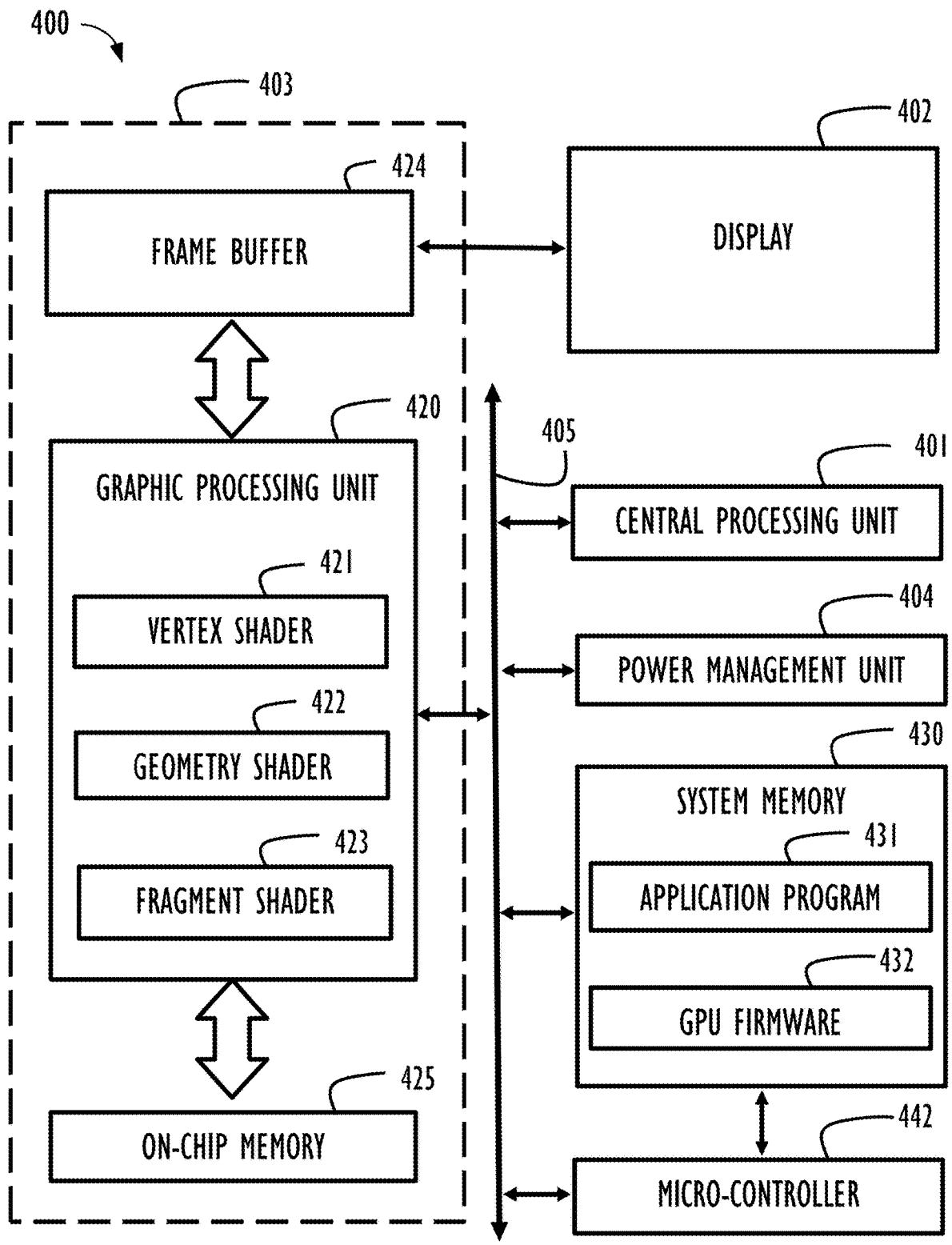
FIG. 4 is block diagram illustrating a computer system implementing one or more aspects of the disclosed subject matter according to one or more embodiments.

Referring now to FIG. 4, a block diagram of computing system 400 illustrates a computer system according to one embodiment. Computing system 400 includes CPU 401, graphics processing system 403, display 402, power management unit (PMU) 404, and system memory 430. In the embodiment illustrated in FIG. 4, CPU 401 and graphics processing system 403 are included on separate integrated circuits (ICs) or packages. In other embodiments, however, CPU 401 and graphic processing system 403, or the collective functionality thereof, may be included in a single IC or package.

Data bus 405 interconnects different elements of the computing system 400 including CPU 401, system memory 430, and graphic processing system 403. Data bus 405 may be comprised of one or more switches or continuous (as shown) or discontinuous communication links. In an embodiment, system memory 430 includes instructions that cause CPU 401 and/or graphic processing system 403 to perform the functions ascribed to them in this disclosure. More specifically, graphic processing system 403 can receive instructions transmitted by CPU 401 and processes the instructions to render and display graphic images on display 402.

System memory 430 may include application program 431 and GPU firmware 432. GPU firmware 432 is a software controlling the GPU execution of the graphics (or compute) commands received from CPU 401. GPU firmware 432 may run on micro-controller 442 (e.g., IC, ASIC, FPGA, and the like). In an embodiment, the micro-controller 442 is an integrated circuit comprising a processor core, input/output interface to communicate with data bus 405, memory, and embedded software (i.e., GPU firmware 432). GPU Firmware 432 may be stored on non-volatile memory of the micro-controller 442 or it could be stored on system memory 430 as shown.

In an embodiment, frame buffer 424 is also located on system memory 430. In another embodiment, application program 431 includes code written using an application programming interface (API). APIs can include a predetermined, standardized set of commands that are executed by associated hardware. Application program 431 generates API commands to render an image by one or more shading engines of GPU 420 for display. GPU firmware (or driver) 432 translates the high-level shading programs into machine code shading programs that are configured for each of the shading engines, e.g., vertex shader 421, geometry shader 422, and fragment shader 423 of GPU 420.

Graphics processing system 403 includes GPU 420, on-chip memory 425 and frame buffer 424. In one embodiment, CPU 401 transmits API commands to GPU 420 to render graphic data and store rendered images in frame buffer 424 to be displayed on display 402. In an embodiment, a frame of graphic data is divided into multiple tiles. Each tile may be rendered to on-chip memory 425 space by GPU 420.

Upon completion of all tiles of a frame, the frame may be output to frame buffer 424 to display the image on Display 402.

GPU 420 can include a plurality of cores or functional elements that are configured to execute a large number of threads in parallel. In an embodiment, at least some of the cores are configured as a shading engine that includes one or more programmable shaders. Each shader engine executes a machine code shading program to perform image rendering operations. In an embodiment according to FIG. 4, the shader engines include vertex shader 421, geometry shader 422, and fragment shader 423. In an embodiment, vertex shader 421 handles the processing of individual vertices and vertex attribute data. Unlike vertex shader 421 that operates on a single vertex, the input received by geometry shader 422 are the vertices for a full primitive, e.g., two vertices for lines, three vertices for triangles, or single vertex for point. Fragment shader 423 processes a fragment generated by rasterization into a set of colors and a single depth value.

PMU 404 is responsible of distributing power among different components of computing system 400. Powering-up GPU 420 is part of an initialization operation to prepare GPU 420 for execution of graphics or compute command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve the most energy. In one embodiment, when no workload is assigned to GPU 420 for execution or when GPU 420 is waiting idle for the next workload, PMU 404 may place GPU 420 in sleep mode and provide minimal power to the unit.

Execution Graph Cache Based Low-Latency Command Execution on GPU

Figure 5:
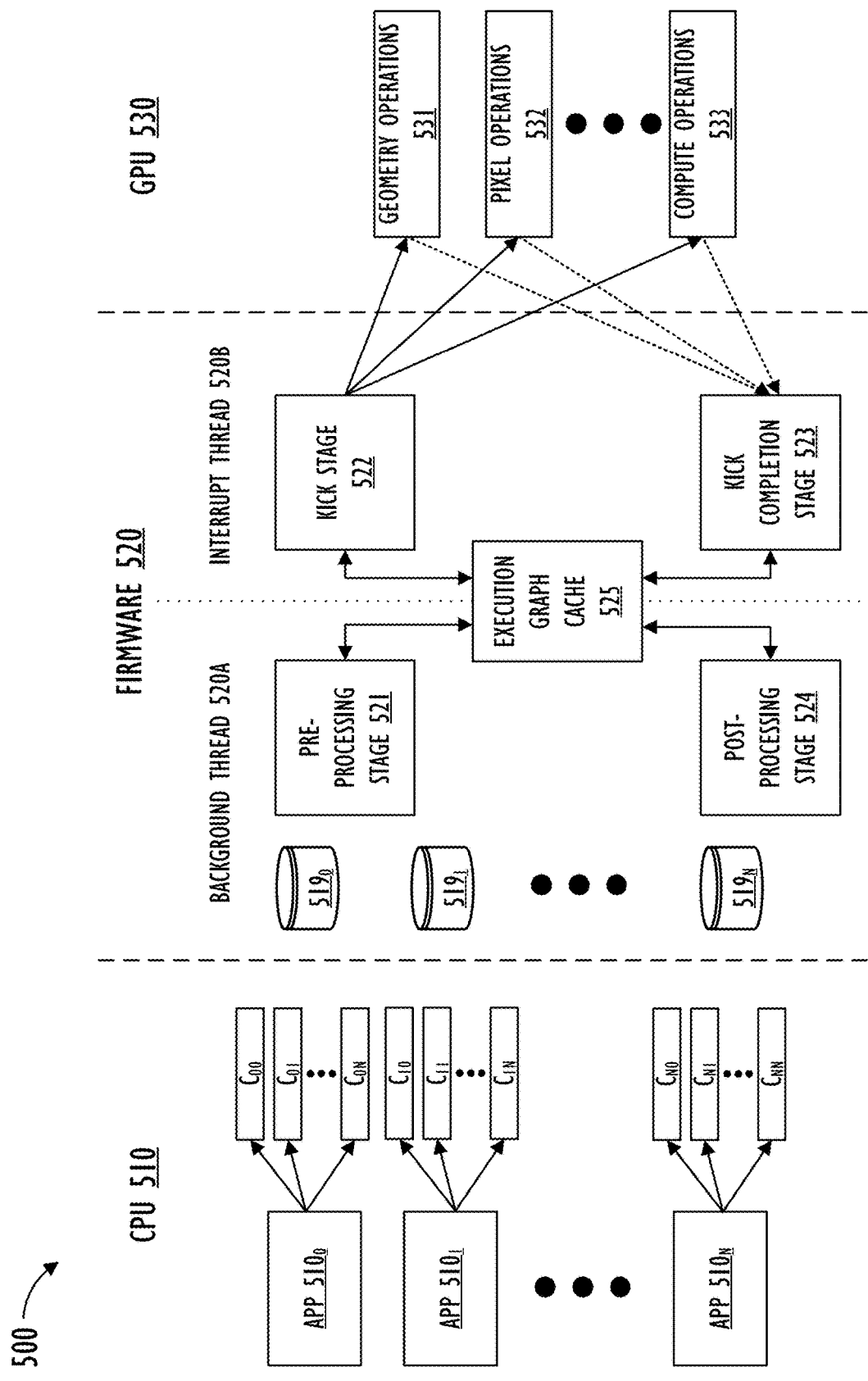
FIG. 5 is a block diagram illustrating the interaction between a CPU, GPU firmware, and a GPU according to an embodiment of the disclosure.

Referring to FIG. 5, block diagram 500 illustrates the interaction between CPU 510, GPU firmware 520, and GPU 530 according to one embodiment of the disclosure. As discussed above, CPU and GPU are two separate and asynchronous processors. In an embodiment, CPU 510 encodes commands and GPU 530 executes the encoded commands. Firmware 520 controls execution of the graphics (or compute) commands received from CPU 510 on GPU 530. Firmware 520 may comprise instructions stored in a non-volatile memory and executed by a separate micro-controller as previously discussed with reference to FIG. 4. Alternatively, or in addition, firmware 520 could be a custom-designed hardware micro-controller (e.g., ASIC, FPGA, and the like) implementing functionality to minimize latency in command execution by GPU 530. That is, the features described herein in connection with GPU firmware 520 may be implemented in any suitable combination of hardware and/or software. It is the goal of firmware 520 (or corresponding hardware) to process and schedule commands (received from CPU 510) for execution on GPU 530 such that the idle time of GPU 530 is minimized.

In an embodiment, CPU 510 may be running a plurality of applications $510_0$-$510_N$. Each of the plurality of applications, for example application $510_0$, may generate a plurality of commands (e.g., $C_{00}$-$C_{0N}$). In one embodiment, CPU 510 may issue instructions and make calls to libraries, APIs, and graphics subsystems to translate the high-level graphics instructions to graphics code (i.e., shader code) executable by GPU 530. The generated commands are encoded and stored in priority command queues $519_0$-$519_N$ and communicated to firmware 520. In general, each application may have a set of priority ordered command queues.

Firmware 520 may fetch commands from command queues 519$_0$-519$_N$ and divide each command into one or more micro-operations as part of pre-processing stage 521. In one embodiment, a micro-operation simplifies complex instructions or commands into a single operation command (also referred to herein as "micro-command"). Each command or micro-command is then processed by the command processing pipeline of firmware 520. As shown in FIG. 5, the processing pipeline of a command (or micro-command) from CPU 510 to GPU 530 may involve multiple stages including pre-processing stage 521, kick stage 522, kick completion stage 523, and post-processing stage 524. In one embodiment, operations corresponding to stages 521-524 may be performed by two separate threads corresponding to GPU firmware 520, a low-priority background thread 520A and a high-priority interrupt thread 520B. Threads 520A and 520B may be two separate threads running on the same processor. Further, threads 520A and 520B may be two separate threads of execution of firmware 520 allowing the computer system to multitask by switching back and forth between the two threads, enforce differing levels of priority for corresponding tasks, and perform execution of instructions corresponding to the two threads asynchronously. Interrupt thread 520B may have a higher priority than background thread 520A, allowing interrupt thread 520B to halt execution of background thread 520A as needed, and prioritize execution of instructions by interrupt thread 520B.

Actions associated with pre-processing stage 521 and post-processing stage 524 may be performed by background thread 520A, and actions associated with kick stage 522 and kick completion stage 523 may be performed by interrupt thread 520B. That is, background thread 520A may be responsible for operations of the processing pipeline up until the command is inserted into cache memory 525 for execution on GPU 530, and after the command is ready for being flushed from cache memory 525 post command execution on GPU 530. Interrupt thread 520B may be responsible for directly interacting with GPU hardware, submitting commands to GPU 530 for execution at kick stage 522 based on priority and scheduling information, receiving notification from GPU 530 when GPU 530 completes execution of the command and performing operations like edge walking (e.g., traversal) for the completed command at the kick completion stage 523.

As explained previously, commands fetched by firmware 520 from command queues 519$_0$-519$_N$ may depend on each other. As a result, a particular execution order determined based on the dependency must be enforced while executing commands from command queues 519$_0$-519$_N$ on GPU 530. A dependency means that data generated by a first command (e.g., graphics or compute command or micro-command) is needed for processing a second command. As such, GPU 530 may not be able to start execution of the second command until its prerequisite one or more (first) commands are completely processed. Lack of any dependency relationship between any two commands means both commands can be executed in parallel. Conversely, in order to enforce an ordering between two commands, associated dependency must be established. Commands of the same command queue may have dependencies such that a child command of the queue is dependent upon execution of a parent command of the same queue. Commands belonging to different command queues may also be entitled to have dependencies between each other.

By way of example, GPU 530 may be performing different operations, such as geometry operations 531, pixel operations 532, and compute operations 533. In an embodiment, execution of a pixel command may depend upon data generated from a geometry command. For example, the geometry commands can generate a list of primitives that are then processed by the pixel commands. More specifically, for submission of a pixel command to GPU 530 at kick stage 522 by interrupt thread 520B, the geometry command, which the pixel command depends on, must first be completely processed. Therefore, pre-processing 521, kick 522, and kick completion 523 stage operations of the geometry command must first be completed before the pixel command may be fed to GPU 530 for processing at kick stage 522.

As another example, any two commands executing on GPU 530 could share a texture or surface. As such, a dependency relationship may exist between the two commands such that a first command (e.g., the producer) writes to the surface and a second command (e.g., the consumer) reads the write by the producer. Therefore, the dependency between the two commands requires the execution of the write command before the execution of the read command. It is important to provide a method of resolving dependencies between the commands such that the idle time of GPU 530 is reduced.

In one method for resolving dependencies, when the GPU notifies firmware that it has completed execution of a first command and is ready to receive and execute a next command, interrupt thread 520B may notify background thread 520A to update dependencies associated with the completion of execution of the first command, and add new commands to a queue (e.g., first in first out (FIFO) ring buffer) of commands that are ready for execution and whose parents have all completed. In this case, when there are one or more commands that have completed pre-processing and that are stored in a separate queue of commands that have completed pre-processing, background thread 520A must query, for each command in the separate queue of commands, whether each of its parents have completed execution. Background thread 520A may then add a command whose parents have all completed to the FIFO ring buffer. Interrupt thread 520B may then kick the newly added command from the FIFO buffer to the GPU for execution. However, such methods may result in inefficient use of GPU resources, causing the GPU to stay idle for long periods between command executions because a command must repeatedly query each of its parents to determine whether all of them have completed.

An alternate method that may, in some instances, provide improvements over the method described above for resolving dependencies may involve the use of a background thread 520A to create and maintain a graph (e.g., directed acyclic graph (DAG)) based on the dependency information for each incoming command at the pre-processing stage and determine a wait count indicating the number of commands or nodes that must be executed first, prior to execution of the node associated with the wait count. Background thread 520A may then analyze the graph, add nodes (commands) from the graph with a wait count of zero to a ready queue (e.g., FIFO ring buffer) of commands, each of which is ready for execution by the GPU and may be executed in any order.

In such an alternate method, when the GPU notifies firmware that it has completed execution of a first command and is ready to receive and execute a next command, interrupt thread 520B may notify background thread 520A to update dependencies based on the completion of execution of the first command, and add commands to the FIFO buffer of commands that are ready for execution and whose parents have all completed execution (i.e., commands with wait count=0). In this case, upon receipt of the kick completion notification from GPU, interrupt thread 520B notifies background thread 520A to perform for the completed command, an edge walk (e.g., traversal) operation on the maintained graph of commands to identify dependencies (i.e., child commands) of the completed command, decrement their wait count, and if the decremented wait count of any of the commands in the graph is now zero, add such a command to the FIFO buffer. The information conveyed by the graph including the commands, their dependencies, and wait count, may be stored as a bitmap in memory. The background thread may thus be required to traverse scattered memory locations of the bitmap to decrement the wait count of the child nodes and identify new ready commands when performing the edge walking for a completed command. However, such scattered traversal is perilous from a memory access perspective and may waste precious GPU cycles in traversing the graph to determine whether a (and which) child node is now ready for execution, and then update the FIFO buffer with the now ready child command. The background thread 520A may then add any such new commands with wait count of zero to the FIFO buffer, and interrupt thread 520B may then asynchronously kick the command newly added to the FIFO buffer for execution on the GPU during the next interrupt traversal of the buffer.

Although the alternate method described above is an improvement over some other methods, even this alternate method has may be improved upon, since it involves utilizing a data structure of ready commands (i.e., the FIFO buffer) that knows nothing about child dependencies of the commands. Further, the "round-trip" time upon kick completion from interrupt thread 520B to background thread 520A to perform the edge walk operation on the graph, decrement wait count, update the FIFO buffer with the newly added command with wait count of zero, and notify interrupt thread 520B to kick the new ready command to GPU may cause delay, which may be further amplified with execution of hundreds or thousands of commands from one or more command queues of one or more applications executing on the computer system. Still further, edge walking the graph by background thread 520A to decrement the wait count of dependent child commands and identify new commands with wait count of zero may involve "pointer chasing," which is inherently latency-sensitive, since it involves accessing multiple memory cells that may be scattered all over memory. Although such an alternate method is an improvement over some other methods, this method may still cause undesirable dependency stall latencies between command executions. The method described in the present disclosure improves on the various techniques described above in several aspects, e.g., to ensure low latency and reduce the idle time of GPU 530 even further.

As shown in FIG. 5, the present techniques may employ an execution graph cache 525 to store commands after background thread 520A has completed pre-processing operations at stage 521 for the commands. Pre-processing stage 521 of the processing pipeline of a command may involve one or more operations performed by background thread 520A after the command is encoded by host 510, and put in a command queue (e.g., $519_0$-$519_N$). For example, in pre-processing stage 521, background thread 520A may fetch the command from the command queue, perform dependency analysis, add barrier commands based on the dependency analysis, add the command (including dependency information) to a data structure, update an execution graph to add the fetched command and corresponding dependency information to the graph, determine wait count of the command added to the execution graph, and determine whether to insert the command including corresponding dependency and wait count information into execution graph cache 525 based on a predetermined cache insertion policy included in GPU firmware 520.

Other operations that may also be performed for the fetched command by background thread 520A at pre-processing stage 521 may include memory space allocation, resource allocation, scheduling, calling appropriate instructions, determining priority, and cache validations. Although this disclosure describes operations of pre-processing stage 521 and post-processing stage 524 being performed by background thread 520A. This may not necessarily be the case. In some embodiments, at least some of the operations of pre-processing stage 521 and post-processing stage 524 may be performed by host 510 and/or interrupt thread 520B. Additional details of processing pipeline operations for commands performed by background thread 520A (and/or host 510 and/or interrupt thread 520B) at pre-processing stage 521 are provided below in connection with the disclosure in FIGS. 6 and 7.

Figure 6:
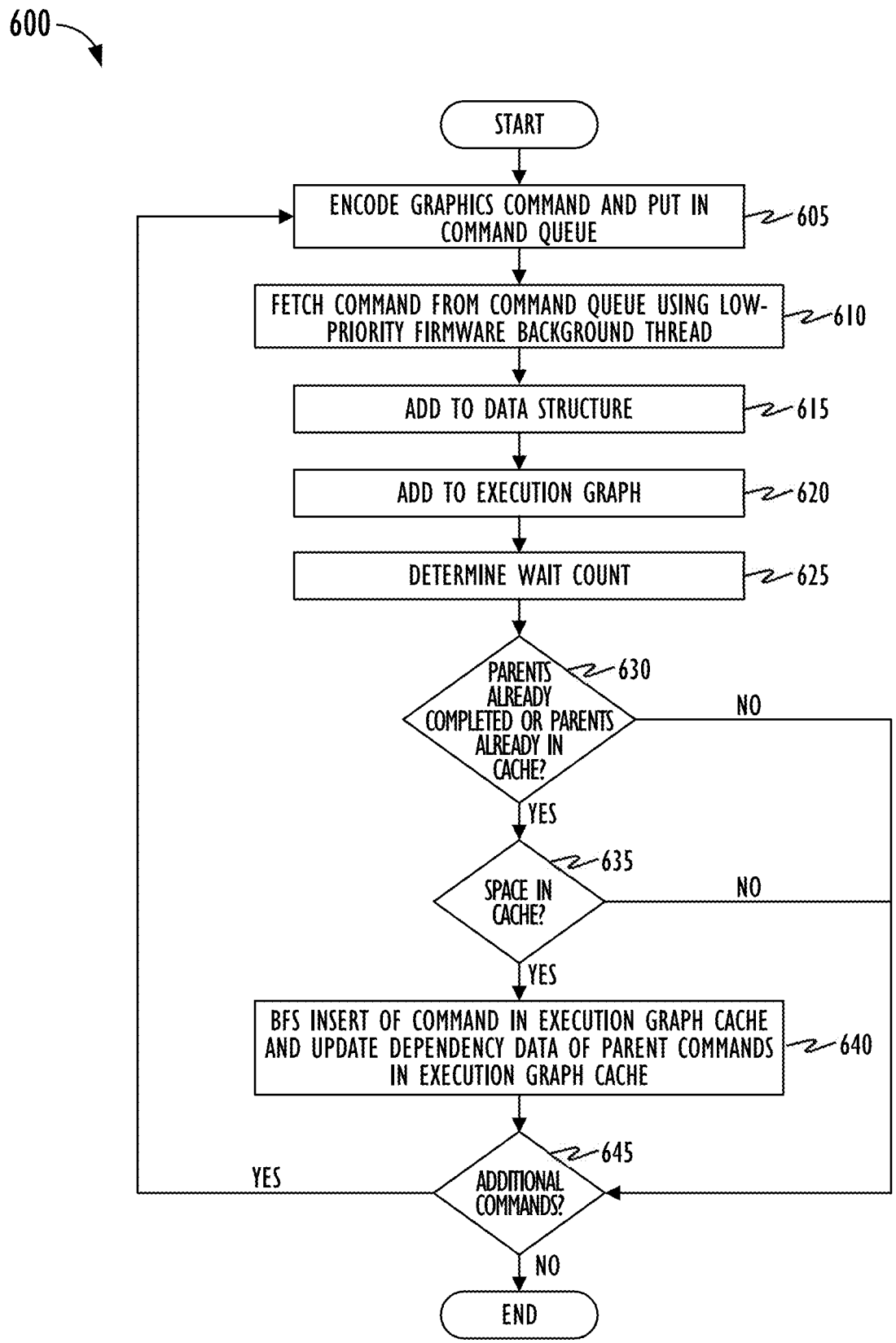
FIG. 6 is a flowchart of an exemplary method of resolving dependencies between commands and inserting commands into a cache for execution by the GPU according to an embodiment of the disclosure.

FIG. 6 is a flowchart of exemplary method 600 of resolving dependencies between commands, organizing the commands in an execution graph, and inserting a subset of the commands into execution graph cache 525 for execution on GPU 530 according to an embodiment of the disclosure. Method 600 begins at block 605 with host 510 encoding a command received from an application (e.g., one of applications $510_0$-$510_N$) and storing the encoded command into a corresponding command queue (e.g., one of command queues $519_0$-$519_N$). As noted previously, the command could be a graphics or compute command or micro-command that is encoded by host 510 for execution on GPU 530. Each command queue may store a plurality of commands. The encoded command may also include dependency information indicating one or more other commands in the same or different command queue the particular command depends on. At block 610, background thread 520A may fetch the encoded command from the command queue including the dependency information based on predetermined scheduling and priority operations of the command processing pipeline at pre-processing stage 521.

In one embodiment, priority of commands may be setup at command queue construction time. For example, each of command queues $519_0$-$519_N$ may have a priority associated with it. The priority may be an immutable value that is the same for all the commands/micro-commands within a command queue. At block 610, this priority of the command may be passed down. In an embodiment, each command may be first categorized into one of a plurality of priority groups. Then, the system may enforce a desired priority based on a priority policy. For example, if commands are categorized in two categories of zero and one, a priority policy may prioritize all category zero commands over the category one commands. The priority policy may be updated dynamically at any time based on the processing conditions of the system.

Figure 7:
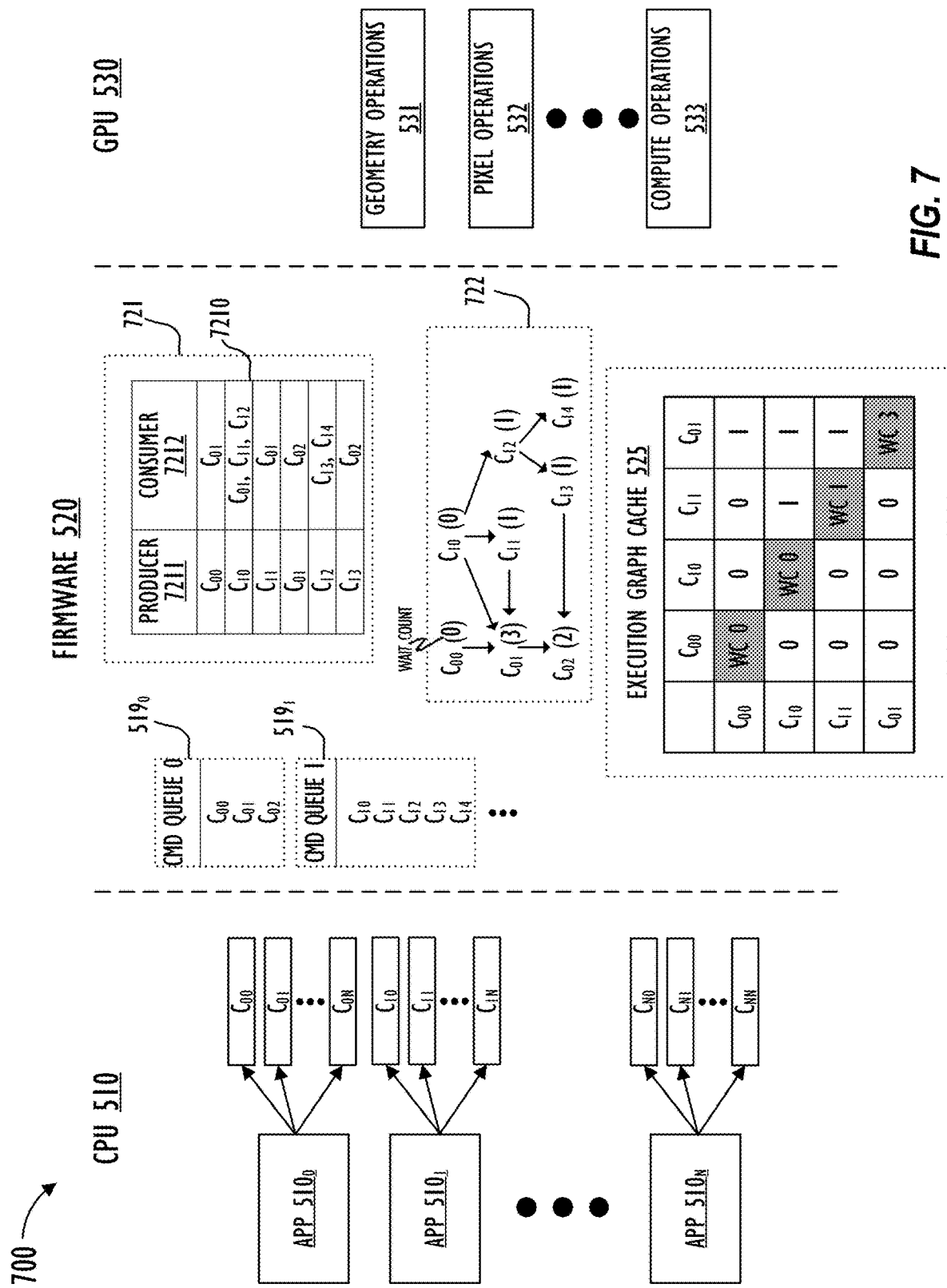
FIG. 7 is a block diagram illustrating the interaction between a CPU, GPU firmware, and a GPU according to another embodiment of the disclosure.

At block 615, background thread 520A (and/or host 510 and/or interrupt thread 520B) may add the fetched command including any associated dependency information to a stream of commands in a data structure of firmware 520, for example, holding station 721 of GPU firmware 520 as shown in FIG. 7. As shown in FIG. 7, holding station 721 may include data structure 7210 to register and track a stream of commands fetched from CPU 510. Data structure 7210 may also register and track data regarding (parent and child) dependency of the fetched commands. For example, when host 510 determines that a new incoming command depends on another command encoded and stored in the command queue, host 510 may insert on the command queue, a barrier command representing the parent-child (e.g., producer-consumer) relationship between the two commands. A barrier command enforces a producer-consumer relationship between the two commands by allocating a memory cell for a producer command and indicating that when the producer completes, it will write data to the allocated memory cell, and the consumer command will read from the allocated memory cell the data written by the producer. Because of this relationship, the barrier command may not let the consumer proceed with execution until and unless the producer command has completed execution first.

To represent the dependency information, as shown in FIG. 7, data structure 7210 may include data regarding producers 7211 and consumers 7212. Producers 7211 include parent commands that generate data required for processing by consumers 7212 (i.e., child commands). For example, in data structure 7210, $C_{01}$ depends on $C_{00}$. Therefore, data generated by $C_{00}$ is necessary for execution of $C_{01}$. Similarly, in data structure 7210, $C_{01}$, $C_{11}$, and $C_{12}$ depend on $C_{10}$. Therefore, data generated by $C_{10}$ is necessary for execution of each of $C_{01}$, $C_{11}$, and $C_{12}$. In one instance, a parent command may be a geometry command and a child command may be a pixel command. Holding station 721 thus prepares a stream of commands received from CPU 510 for placement within execution graph 722.

Returning to FIG. 6, at block 620, background thread 520A adds to an execution graph, the command fetched at block 610 and added to the data structure along with its dependency information at block 615. Referring again to FIG. 7, in one embodiment, execution graph 722 may be a Directed Acyclic Graph (DAG) with each node representing a command (or a micro-command) and each edge representing a parent-child dependency between the two connected nodes. When execution graph 722 is implemented as a DAG, as shown in FIG. 7, the dependencies between the nodes may be drawn in a top-down unidirectional fashion. Execution graph 722 defines an order of execution for the plurality of commands in graph 722.

Background thread 520A may utilize the dependency data indicating edges and barriers between commands stored in data structure 7210 and convert the data into execution graph 722 (e.g., DAG). In execution graph 722, the node representing a particular command may be connected with an edge to a parent node. The parent node may have been added to execution graph 722 in prior rounds or it could be added to the graph at the same time as the child node. When the dependency of a command is known, both the child command and the parent command that it depends on may be included in the graph.

As new commands are encoded at host 510, the commands may include dependency data indicating who their parent commands are that are already encoded and stored into command queues. Based on this parent dependency information and associated child-to-parent edges and corresponding barrier commands added in the command queues, background thread 520A (and/or host 510 and/or interrupt thread 520B) can generate the stream of commands stored in data structure 7210 including the dependency information and construct or insert each new command from the command stream in data structure 7210 into DAG 722 which is essentially an anti-dependency graph, in which the edges are flipped from parent-to-child, instead of from child-to-parent. Thus, with the techniques shown in FIGS. 6-7, instead of the child node having to repeatedly check whether each of its parent nodes has completed in order to determine whether the child is now a "ready command" (i.e., ready for GPU execution), the anti-dependency model causes the parent node to inform each of its child nodes once it has completed executing. This increases processing efficiency because the child node does not have to repeatedly keep checking on the execution status of each parent node. As a result, new child nodes that are now ready commands can be identified faster. As shown in FIG. 7, edges in execution graph 722 are directed from parent node to child node.

In FIG. 6, method 600 may then proceed to block 625 where background thread 520A (and/or host 510 and/or interrupt thread 520B) determines the wait count for the command added to execution graph 722. As shown in execution graph 722 in FIG. 7, each command has a wait count (shown in parenthesis) which is essentially how many parent commands it must wait for before executing. For example, as shown in graph 722 of FIG. 7, $C_{00}$ is a root node with a wait count of 0, which means it can be stored in execution graph cache 525 and executed immediately by GPU 530. Further, $C_{10}$ is also a root node with a wait count of 0. Thus, $C_{10}$ can also be stored in execution graph cache 525 and executed immediately by GPU 530. $C_{11}$ depends from $C_{10}$ and thus has a wait count of 1. $C_{01}$ depends from $C_{00}$, $C_{10}$, and $C_{11}$ and thus has a wait count of 3. And so on.

In one embodiment, data corresponding to the plurality of commands and corresponding wait count information included in data structure 7210 may be stored in individual memory cells (e.g., DRAM) and dependency information indicating parent-child or producer-consumer relationships between the commands may be established using pointers, linked-lists, and the like. In other words, accessing dependency and wait count information by traversing edges of execution graph 722 and accessing corresponding scattered locations all over memory may require high latency.

On the other hand, as shown in FIG. 7, execution graph cache 525 may store a subset of commands and associated dependency and wait count information from among the plurality of commands and associated dependency and wait count information stored in execution graph 722 (data structure 7210) in a locked (or pinned) cache memory 525. For example, data structure 7210 may correspond to a "master copy" of commands and may store thousands of commands (e.g., 1,000-2,000 commands). Out of these commands, cache memory 525 may only store a small subset of commands (e.g., 64-128 commands).

In one embodiment, execution graph cache 525 may be implemented as an adjacency matrix. For example, execution graph cache 525 may be a 64×64 or 128×128 adjacency matrix which is entirely stored in cache memory. Although embodiments disclosed herein describe cache 525 being implemented as an adjacency matrix, this may not necessarily be the case. In other embodiments, cache memory 525 may be implemented using some other type of predetermined data structure, like a sparse data structure (e.g., skip list, linked list of tuples, and the like). For example, dependency information for each command may be stored for a predetermined number of children at a time in cache memory 525. More generally, any type of data structure or look up table may be used to implement execution graph cache memory 525 for interrupt service purposes, so long as a command and related dependency data can be stored in a cache line that can provide contiguous memory access, memory locality, fast traversal time post command completion, thereby enabling quick feeding of the GPU with a next, newly ready command (i.e., command whose wait count became zero as a result of completion of execution of a parent command).

FIG. 7 shows an embodiment where execution graph cache 525 is implemented as an adjacency matrix. As shown in FIG. 7, each row of the adjacency matrix may correspond to one of the cached commands from graph 722 and each bit of the row may correspond to one of the other commands currently inserted in cache 525 and may represent child dependency information (e.g., child dependency data) of the row command. In this arrangement, a set bit (e.g., value of 1) may indicate a dependency relationship between the corresponding commands. Thus, for example, for the first row corresponding to $C_{00}$, the set bit for the $C_{01}$ column indicates that $C_{01}$ depends from $C_{00}$. Similarly, for the second row of matrix 525 corresponding to $C_{10}$, the set bits for the $C_{11}$ and the $C_{01}$ columns indicate that both $C_{11}$ and $C_{01}$ depend from $C_{10}$. Data structure 7210 and execution graph 722 also show that $C_{12}$ also depends form $C_{10}$. However, this is not shown in cache 525 in FIG. 7. In FIG. 7, only a 4×4 adjacency matrix is shown for the sake of simplicity. However, as explained earlier, adjacency matrix 525 may include additional rows and columns (e.g., 128× 128) with additional set bits for additional dependent nodes.

Adjacency matrix 525 is locked in cache memory and configured so that each row corresponding to a cached command fits within a single cache line. In addition, the wait count corresponding to each cached command (row) in also stored in cache memory, e.g., as a 5-bit piece of data. In the example implementation shown in FIG. 7, the wait count for each row is shown as being stored in the same row (e.g., in cells arranged diagonally). However, this arrangement is only for ease of explanation. Wait counts for each row (command) inserted in cache 525 may be stored using any suitable arrangement (e.g., in the same cache line or in a different cache line) as long as the wait counts are stored in cache memory and remain updatable during traversal upon command completion with low latency (e.g., without requiring memory hopping, switching between background and interrupt threads, with memory locality and contiguous access, and the like).

Since not all commands from data structure 7210 may be stored in cache 525 (only a subset of commands may be stored in some embodiments), inserting commands into cache 525 may require adherence to a command insertion policy. The command insertion policy may be programmed or hard-coded into GPU firmware 520 and may dictate a breadth-first search (BFS) insertion of commands from execution graph 722 into cache 525 based on space availability. For example, commands may be inserted into cache 525 based on a breadth-first search by wait count of execution graph 722. The command insertion policy may further dictate that a command may be inserted into cache 525 only when each of its parent commands have already completed execution on GPU 530 or are already stored in cache 525. Such an insertion policy ensures that lines of cache 525 are not wasted by storing child nodes whose parents are not yet in cache (and consequently, the child nodes are barred from executing).

Returning to FIG. 6, after determining wait count at block 625, method 600 proceeds to block 630 where background thread 520A (and/or host 510 and/or interrupt thread 520B) performs cache insertion of the command added to execution graph 722 based on the command insertion policy. In particular, at block 630, background thread 520A (and/or host 510 and/or interrupt thread 520B) determines with respect to the current command being pre-processed at pre-processing stage 521, whether parents of the command have already completed executing or whether (all of) the parents of the command are already in cache 525. That is, at block 630, host 510 or firmware 520 determines whether wait count for the current command=0 (i.e., parents have completed executing on GPU 530 or current command is a root node with no parents). If the wait count is not zero, at block 630, host or firmware 520 also determines whether all of the parents of the current command are already inserted in cache. If it is determined that the parents have already completed or are already in cache (YES at block 630), host 510 or firmware 520 determines whether there is space in cache (block 635). As explained previously, cache may have a predetermined size (e.g., 16 KB, 32 KB, 64 KB, and the like) and may only hold a subset of commands from the "master copy" of commands stored in data structure 7210 and represented by graph 722. If it is determined that there is space in cache 525 (YES at block 635), method 600 proceeds to block 640 where a BFS insertion of the command by wait count into execution graph cache 525 is performed by host 510 or one of the threads of execution of GPU firmware 520, and dependency data of any parent commands currently stored in the cache 525 is updated based on the information regarding parents of the current command. At block 640, the command may be inserted in cache 525 along with its child dependency data and wait count.

For example, in the case of graph 722 as shown in FIG. 7, since nodes from the graph may be inserted in BFS order, $C_{00}$ may be inserted first in cache 525 when background thread 520A begins executing and starts creating the graph 722 shown in FIG. 7 based on incoming encoded commands on command queues. Further, since $C_{00}$ is a root node, its wait count is zero and it has no parents (or they have all completed). So, at block 640, $C_{00}$ gets inserted in cache 525 assuming there is space in the cache. Next, $C_{10}$ may be inserted based on a BFS operation on graph 722 and, since $C_{10}$ is also a root node, its wait count is also zero and it also has no parents (or they have all completed). So, at block 640, $C_{10}$ also gets inserted in cache 525 assuming there is space in the cache.

Next, $C_{11}$ may be inserted based on a BFS operation on graph 722. Here, since $C_{11}$ depends from $C_{10}$, its wait count=1, and, since $C_{10}$ is already in the cache, at block 640, $C_{11}$ also gets inserted in cache 525 assuming there is space in the cache. Further, at block 640, host 510 or firmware 520 may, based on the dependency information associated with $C_{11}$ in graph 722, update or set the bit corresponding to $C_{10}$ row and $C_{11}$ column of cache 525 to reflect that child $C_{11}$ depends on parent $C_{10}$. At block 640, each parent bit in cache 525 may similarly be set to update dependency data of parent commands which must be executed prior to execution of $C_{11}$. Note here that, since $C_{01}$ depends from parent $C_{11}$, $C_{01}$ may not be BFS inserted into cache 525 prior to inserting $C_{11}$ because when iterating for $C_{01}$ at block 630, it will be determined that all of its parents (i.e., $C_{11}$) are not already in cache 525.

The above determination for $C_{01}$ will change post $C_{11}$ cache insertion so that $C_{01}$ gets inserted in cache 525 with wait count=3 based on its dependency on parents $C_{00}$, $C_{10}$, and $C_{11}$, and because each of its parents is already in cache 525. Further, at block 640, host 510 or firmware 520 may, based on the dependency information associated with $C_{01}$ in graph 722, update or set bits corresponding to: (i) $C_{00}$ row and $C_{01}$ column; (ii) $C_{10}$ row and $C_{01}$ column; and (iii) $C_{11}$ row and $C_{01}$ column, of cache 525 to reflect that child $C_{01}$ depends on parents $C_{00}$, $C_{10}$, and $C_{11}$. For each row corresponding to a command that is inserted in cache 525, the bits representing the child dependency data are stored along with the wait count for the command corresponding to the inserted row. Thus, simply by reading the row (which may be stored in a single cache line) corresponding to a completed command, the interrupt service may be able to easily identify all child commands in the cache 525 that depend on the completed row command, and also identify the wait count.

If, on the other hand, it is determined that parents have not completed or are not already in cache (NO at block 630), or if it is determined that there is no space in cache 525 (NO at block 635), method proceeds to block 645 where the system waits for additional incoming commands and repeats the process starting at block 605 for each new encoded command added to one of the command queues. Background thread 520A (or host 510 or interrupt thread 520B) may thus repeatedly execute to fetch commands, store the commands in holding station 721, and generate, maintain, and update anti-dependency graph 722 including wait count and dependency information for each command, based on the stream of un-executed commands stored in holding station 721, and selectively insert a subset of the commands from holding station 721 into cache 525 based on the insertion policy. By inserting a command from execution graph 722 into cache 525 even if execution of all of the parents of the inserted command has not completed yet, idle time of GPU 530 can be reduced by keeping a next command "ready to go" in cache, immediately upon completion of execution of the parent command.

In order to avoid a situation where dependency data of a parent command in cache 525 that has already been kicked to GPU 530 for execution by interrupt thread 520B gets updated by insertion of a child command in cache 525, in one embodiment, the cache line or row corresponding to the parent command may be locked once it has been picked up by the interrupt thread to avoid "after the fact" setting of any corresponding dependency bits in cache 525. For example, when $C_{01}$ comes into cache 525 and indicates that is depends on $C_{00}$, $C_{10}$, and $C_{11}$, which are already in cache, $C_{00}$ may have already been picked up for execution by interrupt thread 520B. In this case, the row (e.g., cache line) corresponding to $C_{00}$ in the adjacency matrix 525 may be locked for editing so that $C_{00}$ is treated as a completed parent command for the newly inserted $C_{01}$. Locking the cache upon child command insertion allows background thread 520A (or host 510 or interrupt thread 520B) inserting a new row in cache 525 to test if each of the parents of the new child command (which parents are already in cache 525) have already completed. In case they have completed (or have already started execution on GPU hardware), their dependency bit corresponding to the new child command need not be updated and the wait count for the new child command may be set accordingly. That is, before inserting a new command into cache 525, firmware 520 (or host 510) may trivially test if any of the parents in the cache 525 has completed (or began executing), and if so, then count of that parent may be skipped for determining the wait count of the new inserted child command.

Returning to FIG. 5, operations described above in connection with FIGS. 6-7 relate generally with pre-processing stage 521 of the processing pipeline of commands for execution on GPU 530. As shown in FIG. 5, and as described above, execution graph cache 525 may be updated based on dependency analysis on incoming commands so that a queue of ready commands (i.e., with wait count=0) or commands that are "almost ready" for execution (i.e., commands with wait count greater than 0 but all parents already in cache 525) is maintained for feeding GPU 530 faster and with reduced idle time.

After pre-processing of a command at stage 521 completes, the command is stored in execution graph cache 525, and when wait count of the command inserted in cache 525 reaches zero, interrupt thread 520B may, at kick stage 522, feed the command from cache 525 to GPU 530 for execution. Subsequently, upon successful completion of execution of the command, GPU 530 may send a kick completion signal to interrupt thread 520B at kick completion stage 523, indicating that the command kicked at kick stage 522 has completed. Interrupt thread 520B may then perform predetermined operations associated with kick completion stage 523 corresponding to the completed command. Finally, background thread 520A (and/or host 510 and/or interrupt thread 520B) may perform predetermined post-processing operations associated with the completed command. Details of processing performed at kick stage 522, kick completion stage 523, and post-processing stage 524 of the processing pipeline of the command are explained below in connection with the disclosure in FIG. 8.

Figure 8:
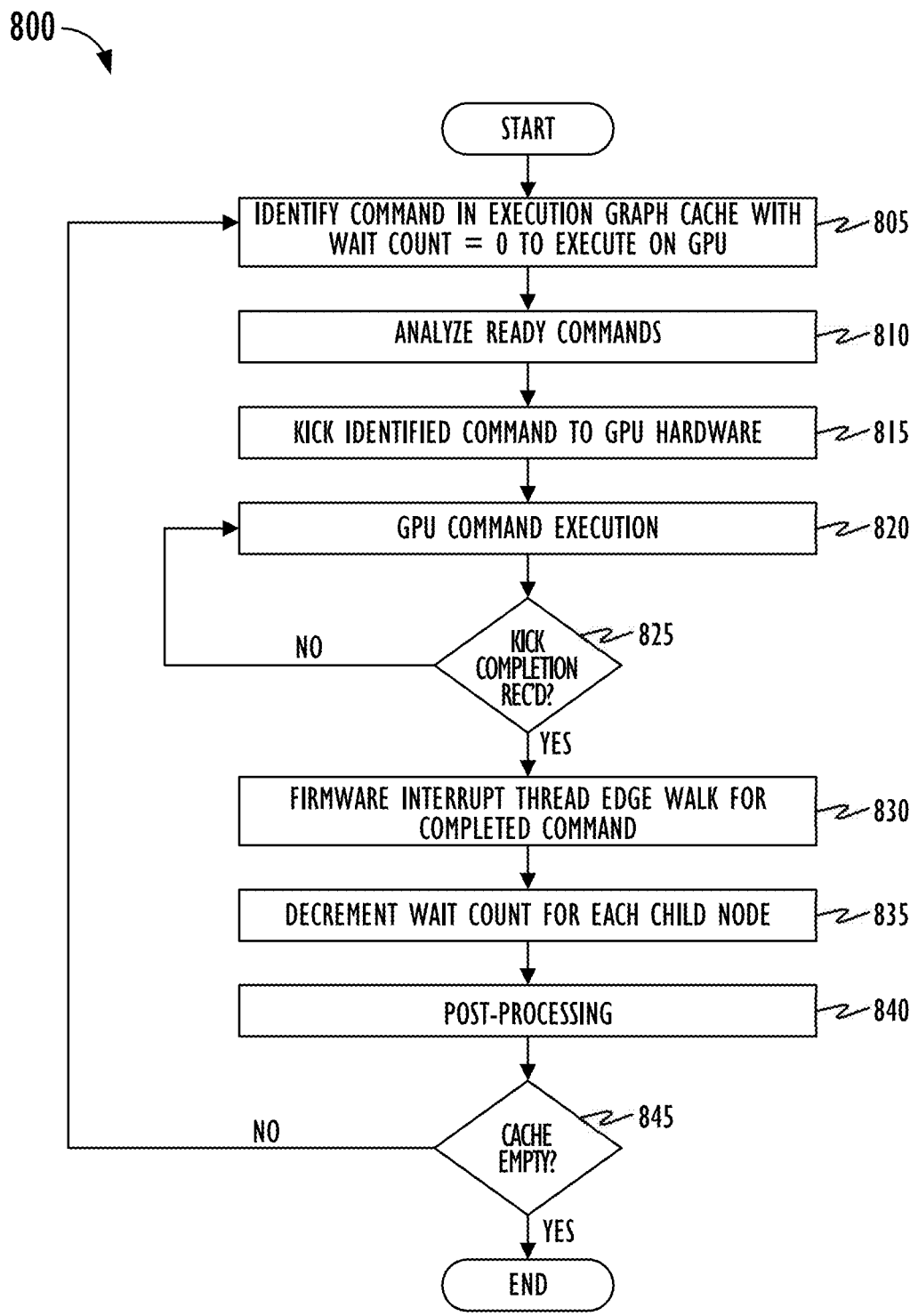
FIG. 8 is a flowchart of an exemplary method of using an execution graph cache for processing commands on the GPU according to an embodiment of the disclosure.

FIG. 8 is a flowchart of method 800 of using execution graph cache 525 for processing commands on GPU 530 according to an embodiment of the disclosure. Pre-processing operations of stage 521, as explained with reference to FIG. 6, and kick stage 522, kick completion stage 523, and post-processing stage 524 operations, as explained with referenced to FIG. 8, may occur asynchronously. Further, since interrupt thread 520B has higher priority, it may halt execution of the background thread 520A to, e.g., feed a command from cache 525 to GPU 530 for execution in response to an interrupt from GPU 530, to ensure GPU 530 does not stay idle. Further, operations corresponding to stages 521-524 of the command processing pipeline may be performed in parallel for different commands who may be at different stages in the pipeline at any given time.

Method 800 begins at block 805 with interrupt thread 520B analyzing commands in execution graph cache 525 to identify commands which have a wait count of 0. That is, at block 805 interrupt thread 520B may analyze cache 525 to determine which of the commands in the cache are ready to execute immediately (i.e., all their dependencies have been met). In one embodiment, since the commands and corresponding wait times are stored in cache memory 525 (with memory locality and contiguous access), interrupt thread 520B may be easily able to obtain wait counts of the commands without having to traverse edges of graph 722 to identify commands with wait count of zero.

At block 810, interrupt thread 520B may analyze the identified ready commands to determine an efficient order for scheduling of execution of the ready commands. The analysis of the ready commands at block 810 may provide priority and/or efficient scheduling information for each command based on predetermined priority and/or scheduling policies, e.g., corresponding to associated command queues or applications on host 510. At block 815, interrupt thread 520B may feed (e.g., send) from cache 525, one of the ready commands that is identified for execution by GPU 530 at blocks 805 and 810. The above identified operations corresponding to blocks 805-815 may be performed by interrupt thread 520B as part of the operations for kick stage 522.

Next, at block 820, GPU 530 may execute the received command, and upon completion of execution of the command, transmit to interrupt thread 520B, a notification indicating kick completion (e.g., completion indication). At block 825, interrupt thread 520B waits for the interrupt from GPU 530 indicating kick completion (e.g., completion indication). When kick completion for the command fed to GPU 530 at block 815 is received (YES at block 825), interrupt thread 520B performs an edge walk operation (e.g., cache traversal) for the completed command at block 830. For example, at block 830, as part of the traversal, interrupt thread 520B reads from cache memory 525 a row on a cache line (e.g., 64-bit double word) where the completed command is stored in cache 525, and performs a bit scan for set bits of the row. As explained previously, each bit corresponding to each of the columns of the fetched row indicates child dependencies (e.g., child dependency data) of the completed command. For each bit that is set in the fetched row (e.g., value is set to 1), interrupt thread 520B may fetch from cache memory 525 the cache line where the wait count value of the command corresponding to the set bit is stored. At block 835, for each fetched wait count value of each set dependency bit of the fetched row, interrupt thread 520B may decrement the wait count of the corresponding child command by a single unit and store the decremented wait count value corresponding to each child command in cache 525. By having interrupt thread 520B feed commands to GPU 530 from cache 525, which stores dependency and wait count information of commands, interrupt thread 520B may be able to quickly find a command that GPU 530 can safely execute next, thereby reducing idle time and/or latency of GPU 530.

For example, with reference to FIG. 7, after $C_{00}$ and $C_{10}$ have already completed executing and have already been removed from cache 525, when kick completion corresponding to $C_{11}$ stored in cache 525 is received at block 825, interrupt thread 520B at block 830 may perform an edge walk (or traversal) operation for $C_{11}$ by fetching the row corresponding to $C_{11}$ from cache 525, and iterating over each of the set bits of $C_{11}$ row. That is, interrupt thread 520B may, for each bit of $C_{11}$ row that is set, obtain from cache 525 the wait count associated with the command corresponding to the set bit of $C_{11}$ row, decrement the wait count by a single unit, store the updated wait count back in cache 525. That is, at block 835, based on the set bit for $C_{01}$ column of $C_{11}$ row, interrupt thread 520B may go to $C_{01}$ row, obtain wait count for $C_{01}$ (which is currently 1 because $C_{00}$ and $C_{10}$ have already completed), decrement the wait count by 1, and store the updated wait count for $C_{01}$. At this point, since wait count of $C_{01}$ is now zero, interrupt thread 520B can immediately feed $C_{01}$ for execution to GPU 530, without any further processing.

Interrupt thread 520B does not need to go back to background thread 520A to ask background thread 520A to update a ready queue of commands by traversing the execution graph whose nodes are scattered all over memory, which may require accessing multiple cache lines. By storing the subset of commands of the execution graph 722 locally in a locked cache 525 providing contiguous access and memory locality, obtaining dependency data of a completed command by reading a single cache line (e.g., double word), and directly decrementing wait counts of child nodes in cache 525, the edge walk (or traversal) operation becomes significantly faster than other methods described above in which the FIFO buffer is allowed to store only those commands whose wait count is zero.

With the cache memory and the cache insertion policy, interrupt thread 520B may be able to resolve dependency information of the parent completed command within a few microseconds or GPU cycles, with the contiguously accessible parent command dependency information and wait count of each identified child node in cache 525. That is, after kick completion of a parent command (e.g., $C_{11}$) is received at interrupt thread 520B, since the child command (e.g., $C_{01}$) is already in cache 525, its wait count can be quickly decremented, and the child command sent to GPU 530 for execution when wait count=0. As a result, the dependency stall time, which starts when the parent command completes execution on GPU 530, can be reduced because the next command (which may be the child command in a scenario where no other commands are available to execute in cache 525) is ready to execute on GPU 530 right away. In this context, dependency stall time can be defined as a stall latency of when GPU 530 is sitting idle, waiting for the next command while firmware is doing a dependency check to decide whether parents of the next command for execution have completed. For example, dependency stall time is the transition time between end of execution of $C_{11}$ to start of execution of $C_{01}$, when $C_{11}$ and $C_{01}$ are the only two commands left in execution graph 722 and consequently, in cache 525.

Returning to FIG. 8, after decrementing the wait count in cache 525 at block 835 as part of operations of kick completion stage 523, method 800 proceeds to block 840 where background thread 520A (or host 510 or interrupt thread 520B) performs post-processing operations on the completed command as part of post-processing stage 524. Operations at the post-processing stage 524 may include cache flushes, updating some memory, and the like.

For example, at post-processing stage 524, background thread 520A (or host 510 or interrupt thread 520B) may remove the completed command from data structure 7210, execution graph 722, and from cache 525 to free up memory. After post-processing, background thread 520A may send the completed command back to host 510 so that the application (e.g., one of $510_0$-$510_N$) that generated and encoded the command knows that the command has completed, save the completion, and the application can now execute. At block 845, when interrupt thread 520B receives an interrupt from GPU 530 indicating it is ready for executing a next command, interrupt thread 520B determines if there are more commands in cache that are ready to execute. That is, upon receiving an interrupt from GPU 530, interrupt thread 520B may submit commands that are pre-processed and ready for execution to appropriate GPU hardware so that idle time of GPU 530 is minimized. If it is determined that more commands are ready (NO at block 845), processing continues from block 805.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, than presented herein. More generally, if there is hardware support some operations described in conjunction with FIGS. 1-8 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
fetching a first command for execution on a graphics processing unit (GPU);
determining dependency information for the first command, wherein the dependency information indicates a number of parent commands that the first command depends on;
inserting the first command into an execution graph, based, at least in part, on the determined dependency information for the first command, wherein the execution graph defines an order of execution for a plurality of commands, wherein the plurality of commands include the first command, and wherein the number of parent commands that the first command depends on are configured to be executed on the GPU before the first command is executed;
determining a wait count for the first command based on the execution graph, wherein the wait count for the first command is the number of parent commands the first command depends on;
determining whether each of the number of parent commands has completed execution on the GPU by determining whether the wait count for the first command is zero;
determining whether each of the number of parent commands has been inserted into an execution graph cache;
inserting the first command into the execution graph cache in response to determining that each of the number of parent commands has completed execution on the GPU or has been inserted into the execution graph cache; and
executing at least the first command from the execution graph cache on the GPU.

2. The method according to claim 1, wherein inserting the first command into the execution graph cache comprises:
storing the wait count for the first command into the execution graph cache; and
storing child dependency data for the first command into the execution graph cache, wherein the child dependency data identifies each child command that is stored in the execution graph cache and that depends on the first command.

3. The method according to claim 2, further comprising:
determining whether there is storage space in the execution graph cache,
wherein the first command is inserted into the execution graph cache in response to determining that there is storage space in the cache for storing the first command, along with the wait count and the child dependency data for the first command.

4. The method according to claim 2, wherein the first command and the child dependency data for the first command are stored in the execution graph cache in a predetermined data structure.

5. The method according to claim 4, wherein the predetermined data structure is an adjacency matrix.

6. The method according to claim 4, wherein the predetermined data structure is a sparse data structure that allows an interrupt service to read the first command and the child dependency data for the first command from a single cache line.

7. The method according to claim 1, further comprising:
sending a first ready command from the execution graph cache to the GPU, wherein the first ready command is a command that is stored in the execution graph cache and that has a wait count of zero;
receiving a completion indication from the GPU upon completion of execution of the first ready command;
reading child dependency data for the first ready command from the execution graph cache in response to receiving the completion indication;
decrementing by a single unit, a wait count for each child command that is stored in the execution graph cache and that depends on the first ready command, based on the read child dependency data for the first ready command; and
sending a ready child command that is stored in the execution graph cache and that depends on the first ready command to the GPU, wherein the wait count of the ready child command is zero as a result of the decrement.

8. The method according to claim 7, wherein reading the child dependency data for the first ready command from the execution graph cache comprises:
reading a row of an adjacency matrix stored in a single cache line of the execution graph cache, wherein the row comprises one or more bits, and wherein each set bit of the one or more bits indicates that a command corresponding to the set bit that is stored in the execution graph cache depends on the first ready command.

9. The method according to claim 1, further comprising:
inserting a subset of commands from among the plurality of commands into the execution graph cache based on a breadth-first search by wait count of the execution graph,
wherein the execution graph is implemented as a directed acyclic graph (DAG).

10. A non-transitory computer readable medium comprising instructions stored thereon that, when executed by one or more processors, cause the one or more processors to:
fetch a first command for execution on a graphics processing unit (GPU);
determine dependency information for the first command, wherein the dependency information indicates a number of parent commands that the first command depends on;
insert the first command into an execution graph, based, at least in part, on the determined dependency information for the first command, wherein the execution graph defines an order of execution for a plurality of commands, wherein the plurality of commands include the first command, and wherein the number of parent commands that the first command depends on are configured to be executed on the GPU before the first command is executed;

determine a wait count for the first command based on the execution graph, wherein the wait count for the first command is the number of parent commands the first command depends on;

determine whether each of the number of parent commands has completed execution on the GPU by determining whether the wait count for the first command is zero;

determine whether each of the number of parent commands has been inserted into an execution graph cache;

insert the first command into the execution graph cache in response to determining that each of the number of parent commands has completed execution on the GPU or has been inserted into the execution graph cache; and cause the GPU to execute at least the first command from the execution graph cache.

11. The non-transitory computer readable medium according to claim 10, wherein the instructions that cause the one or more processors to insert the first command into the execution graph cache further comprise instructions that, when executed by the one or more processors, cause the one or more processors to:

store the wait count for the first command into the execution graph cache; and store child dependency data for the first command into the execution graph cache, wherein the child dependency data identifies each child command that is stored in the execution graph cache and that depends on the first command.

12. The non-transitory computer readable medium according to claim 11, wherein the first command and the child dependency data for the first command are stored in the execution graph cache in a predetermined data structure, and wherein the predetermined data structure is an adjacency matrix.

13. The non-transitory computer readable medium according to claim 10, further comprising instructions that, when executed by the one or more processors, cause the one or more processors to:

send a first ready command from the execution graph cache to the GPU, wherein the first ready command is a command that is stored in the execution graph cache and that has a wait count of zero;

receive a completion indication from the GPU upon completion of execution of the first ready command;

read child dependency data for the first ready command from the execution graph cache in response to receiving the completion indication;

decrement by a single unit, a wait count for each child command that is stored in the execution graph cache and that depends on the first ready command, based on the read child dependency data for the first ready command; and send a ready child command that is stored in the execution graph cache and that depends on the first ready command to the GPU, wherein the wait count of the ready child command is zero as a result of the decrement.

14. The non-transitory computer readable medium according to claim 13, wherein the instructions that cause the one or more processors to read the child dependency data for the first ready command from the execution graph cache further comprise instructions that, when executed by the one or more processors, cause the one or more processors to:

read a row of an adjacency matrix stored in a single cache line of the execution graph cache, wherein the row comprises one or more bits, and wherein each set bit of the one or more bits indicates that a command corresponding to the set bit that is stored in the execution graph cache depends on the first ready command.

15. The non-transitory computer readable medium according to claim 10, further comprising instructions that, when executed by the one or more processors, cause the one or more processors to:

insert a subset of commands from among the plurality of commands into the execution graph cache based on a breadth-first search by wait count of the execution graph, wherein the execution graph is implemented as a directed acyclic graph (DAG).

16. A system comprising:

a graphics processing unit (GPU);

memory; and one or more processors, wherein the memory comprises instructions that, when executed by the one or more processors, cause the one or more processors to:

fetch a first command for execution on the GPU;

determine dependency information for the first command, wherein the dependency information indicates a number of parent commands that the first command depends on;

insert the first command into an execution graph, based, at least in part, on the determined dependency information for the first command, wherein the execution graph defines an order of execution for a plurality of commands, wherein the plurality of commands include the first command, and wherein the number of parent commands that the first command depends on are configured to be executed on the GPU before the first command is executed;

determine a wait count for the first command based on the execution graph, wherein the wait count for the first command is the number of parent commands the first command depends on;

determine whether each of the number of parent commands has completed execution on the GPU by determining whether the wait count for the first command is zero;

determine whether each of the number of parent commands has been inserted into an execution graph cache;

insert the first command into the execution graph cache in response to determining that each of the number of parent commands has completed execution on the GPU or has been inserted into the execution graph cache; and cause the GPU to execute at least the first command from the execution graph cache.

17. The system according to claim 16, wherein the instructions that cause the one or more processors to insert the first command into the execution graph cache further comprise instructions that, when executed by the one or more processors, cause the one or more processors to:

store the wait count for the first command into the execution graph cache; and store child dependency data for the first command into the execution graph cache, wherein the child dependency data identifies each child command that is stored in the execution graph cache and that depends on the first command.

18. The system according to claim 17, wherein the first command and the child dependency data for the first command are stored in the execution graph cache in a predetermined data structure, and wherein the predetermined data structure is an adjacency matrix.

19. The system according to claim 16, wherein the memory further comprises instructions that, when executed by the one or more processors, cause the one or more processors to:
- send a first ready command from the execution graph cache to the GPU, wherein the first ready command is a command that is stored in the execution graph cache and that has a wait count of zero;
- receive a completion indication from the GPU upon completion of execution of the first ready command;
- read child dependency data for the first ready command from the execution graph cache in response to receiving the completion indication;
- decrement by a single unit, a wait count for each child command that is stored in the execution graph cache and that depends on the first ready command, based on the read child dependency data for the first ready command; and
- send a ready child command that is stored in the execution graph cache and that depends on the first ready command to the GPU, wherein the wait count of the ready child command is zero as a result of the decrement.

20. The system according to claim 19, wherein the instructions that cause the one or more processors to read the child dependency data for the first ready command from the execution graph cache further comprise instructions that, when executed by the one or more processors, cause the one or more processors to:
- read a row of an adjacency matrix stored in a single cache line of the execution graph cache, wherein the row comprises one or more bits, and wherein each set bit of the one or more bits indicates that a command corresponding to the set bit that is stored in the execution graph cache depends on the first ready command.

* * * * *